Dec. 8, 1959  C. J. RENFROE  2,916,244
BEAM CLAMP
Filed April 16, 1958  2 Sheets-Sheet 1
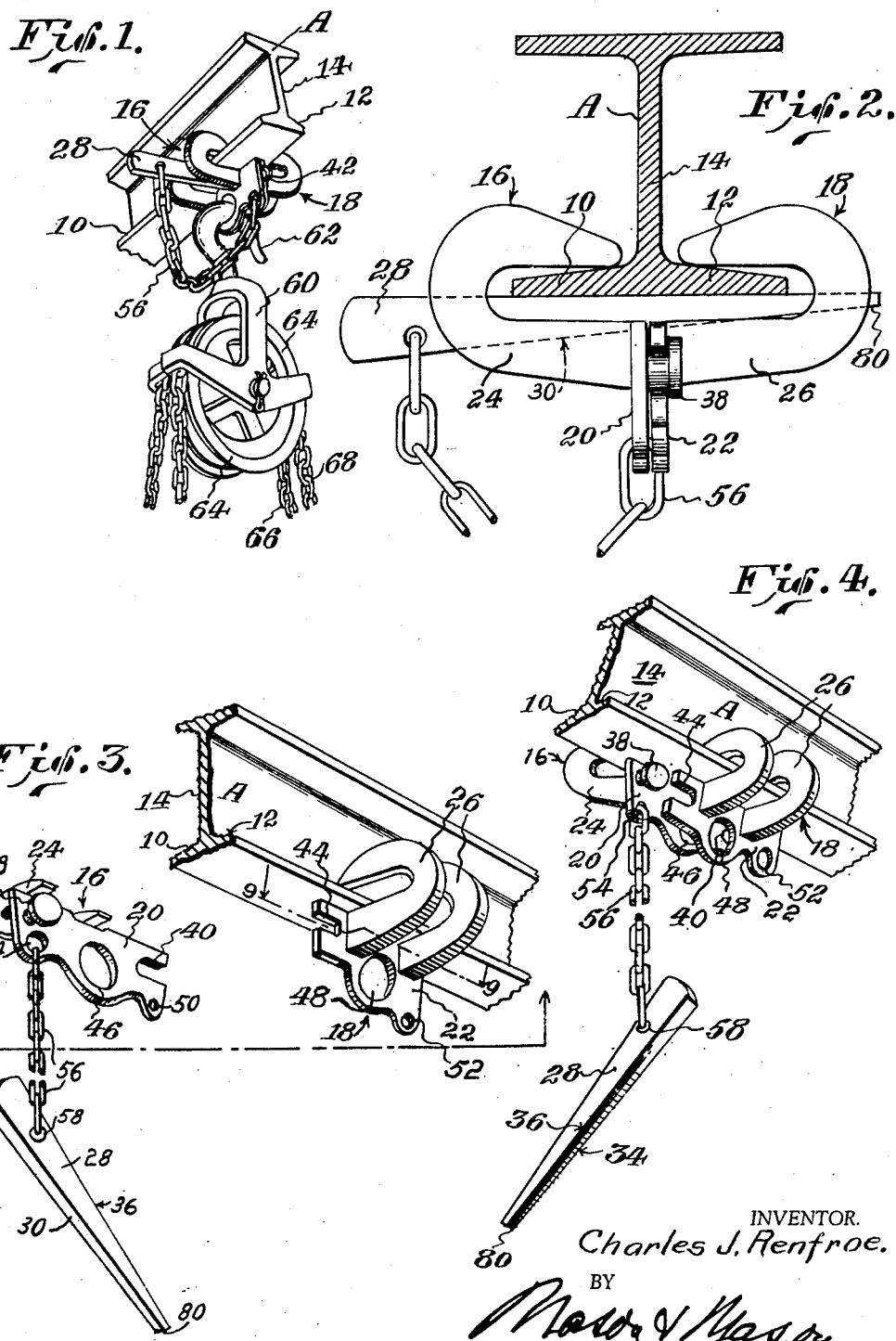
INVENTOR.
Charles J. Renfroe.
BY
Mason & Mason
Attorneys.

Dec. 8, 1959 C. J. RENFROE 2,916,244
BEAM CLAMP
Filed April 16, 1958 2 Sheets-Sheet 2
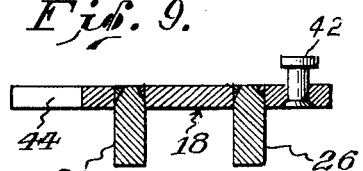
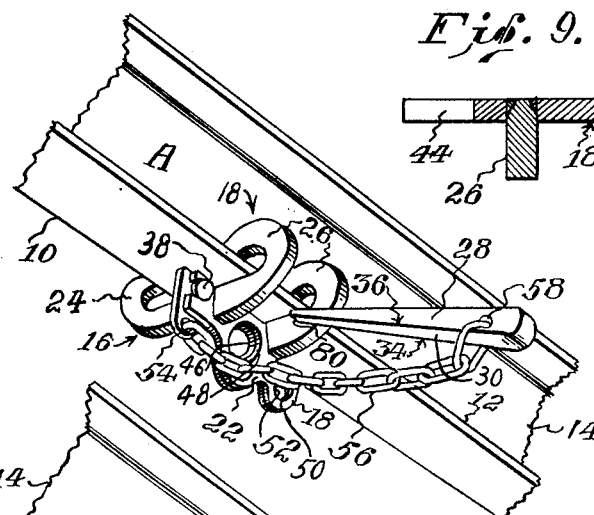
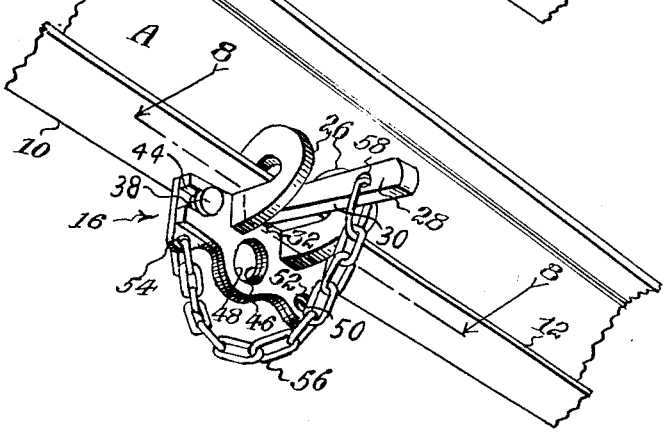
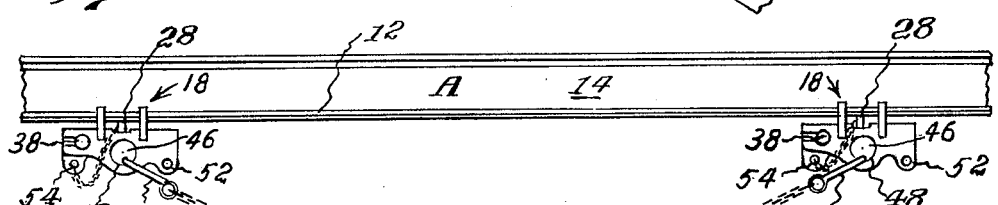
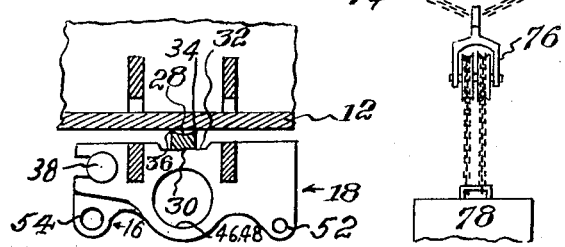
INVENTOR.
Charles J. Renfroe.
BY
Attorneys.

United States Patent Office 2,916,244
Patented Dec. 8, 1959

2,916,244

BEAM CLAMP

Charles J. Renfroe, Jacksonville, Fla.

Application April 16, 1958, Serial No. 728,939

11 Claims. (Cl. 248—228)

This invention relates to improvements in beam clamps or similar constructions, wherein said beam clamps are anchored or retained in fixed position on the lower flanges of a beam, such as an I-beam.

An object of the invention is the provision of a clamp which may be quickly adjusted to provide a positive purchase on the flanges of a beam that may be located in any position, i.e. where the support, such as an I-beam, extends in a horizontal, vertical, or in a position which is diagonal to the aforementioned positions.

Another object is the provision of a beam clamp which in mounted position increases the available headroom over that of clamps previously used, where the maximum head room becomes important, such as in the construction of ships and the repair thereof.

A further object is to provide a clamp composed of a pair of body parts of complementary construction and a third part for readily and simultaneously locking the said body parts to each other and to a supporting member such as an I-beam.

Yet another object is the provision of a clamp composed of complementary parts and held to a support by cam means (such as a wedge), the clamp so designed that the cam means will cause the clamp to more tightly engage the support when the load is applied to the clamp.

Other objects will appear hereinafter throughout the specification.

In the drawings:

Figure 1 is a perspective view of the clamp and its load shown in clamping position on a supporting I-beam;

Figure 2 is a side elevation partly broken away of the clamp with the supporting I-beam shown in section;

Figure 3 is an exploded perspective view of the clamping members and I-beam, with parts broken away;

Figure 4 is a view similar to Figure 3 with the clamping members partially assembled, with parts broken away;

Figure 5 is a view similar to Figures 3 and 4 with the wedge in position for locking the parts to each other;

Figure 6 is a view similar to Figures 3 to 5 but showing the parts in fully locked position;

Figure 7 is a diagrammatic illustration of a supporting means and a pair of clamps and the load supported thereby;

Figure 8 is a section on the line 8—8 of Figure 6; and

Figure 9 is a sectional view taken on the line 9—9 of Figure 3.

Referring now to the drawings, the supporting means is shown at A, and this may comprise an I-beam having lower flanges 10 and 12, respectively. These flanges, as noted in Figure 2, are of such shape that they become thicker as they approach the connecting web 14, for a purpose to be hereinafter described.

Each complementary clamping member 16 and 18 comprises side plates or cutting members 20 and 22 having hook clamps 24 and 26, respectively, two pairs being shown for each clamping member, although a greater or less number of hook members may be employed. It will be noted that the upper free ends of these hook members engage the thicker or stronger portions of the flanges 10 and 12, as shown in Figure 3, whereby the load may be supported from the stronger portions of the I-beam flanges. Although an I-beam is mentioned throughout the specification and claims as a supporting member, it will be understood that any other supporting member may be substituted therefor which is suitable for engagement by clamping members 16 and 18.

Means for locking the clamping members to the flanges of the supporting means, and to each other, comprises a cam means mutually engageable with said flanges and said clamping members. Although it is recognized that various forms of cam means may be utilized, I prefer to employ the wedge 28 having a concave upper surface and cutting edges 34 and 36, shown in the several figures. The clamping members may be so constructed that they lock to each other and to the supporting member. However, the preferred construction includes the wedge 28 with its wedge seating surfaces 30 and 32 and a means for connecting the clamping members to each other to prevent separating movements in a direction transverse to the longitudinal axis of the supporting member. Various means could be employed for this purpose, such as the construction shown in the several figures. Said means comprises a headed stud 38 adjacent one side edge of side plate 20 and a slot 40 extending from the opposite side. The side plate 22 of clamping member 18 shows stud 42 and slot 44 on opposite sides of the plate. It will be noted that these two clamping members are so constructed that the headed stud 38 of clamping member 16 is toward the left and its slot 40 is toward the right while stud 42 is toward the right and slot 44 toward the left of the clamping member 18, as shown in Figures 1 to 3, thus making these members complementary to each other and capable of being joined with each other by relative sliding movement in directions parallel to the flanges of the supporting member. They are detached from each other by the same movements but in opposite directions. For example, clamping member 16 is moved to the right and clamping member 18 to the left in order to join the two clamping members, while clamping member 16 is moved to the left and clamping member 18 is moved to the right to disconnect them.

Each clamping member is provided with means for supporting a load, and while this means may be a hook or any other suitable member, I prefer to provide for this purpose an aperture 46 in clamping member 16 and an aperture 48 in clamping member 18. Additionally, each clamping member 16 and 18 is preferably provided with other supporting means, shown as apertures 50 and 52, respectively.

One of the clamping members, such as the clamping member 18 of Figure 3, is provided with an additional aperture 54 for the support of one end of a chain 56, the opposite end of which engages an aperture 58 in wedge 28.

As seen in Figure 1, a chain fall 60 may be supported in the load supporting apertures 46 and 48 of the clamping members. This chain fall may comprise the usual hook 62, which is attached to pulley mechanism 64 engageable by the chains 66 and 68. Any other type of load may be supported, however, by the clamping members.

Referring now to Figures 7 and 8, of which Figure 7 shows a pair of beam clamps, it will be noted that the load supporting means, such as apertures 46, 48, are provided with hook members 70 and 72 to which a flexible connecting member such as a chain 74 may be connected. Chain 74 supports chain fall 76 for supporting the load designated in Figure 7 by the numeral 78.

The advantages of the beam clamp of this invention include the provision of a number of parts comprising the pair of clamping members and the wedge which are easily and quickly assembled and disassembled, and the manipulation of these members results in a quick, positive purchase on the flanges of the I-beam or other supporting member in any position. In order to assemble the clamp on its support, such as the I-beam shown, the two clamping members are brought together by way of lateral alignment, as shown in Figure 4, on opposite sides of the flanges of the support. They are then moved in opposite directions toward each other until the connecting means, exemplified by the headed studs 38 and 42 and slots 40 and 44, are in engagement with each other. In this position the apertures 46 and 48 are in alignment, as are the apertures 50 and 52, as shown in Figures 5 and 6. The wedge is then inserted on top of the wedge seating surfaces 30 and 32 and beneath the flanges 10 and 12, as seen in Figure 5, and is tapped into the position shown in Figure 6. The parts are then in position for the support of the load, such as indicated in Figure 1 or in Figure 7.

When the load is applied, as shown in Figure 7, the beam clamp shown at the left tends to move toward the right along the supporting means A, while the beam clamp at the right tends to move toward the left along said supporting means. The application of the load tends to rotate each beam clamp as torsional strain is applied, whereby cutting edges 34 and 36 of wedge 28 are caused to bite or cut into the lower surface of the lower flanges of the beam, thus tightly clamping the clamping members against the upper surfaces of the flanges 10 and 12. Said cutting surfaces 34 and 36 will then cut through any extraneous or foreign matter, such as dirt, grease, etc., on the lower surface of the flanges 10 and 12. In other words, the application of a load, as shown in Figure 7, could provide a tendency for the wedge to rotate slightly so that one of its cutting edges would bite into the under surface of the flanges 10 and 12.

The apertures 50 and 52 when in the position of Figure 6 are in alignment, and when it is desired to attach a heavy chain fall for handling a load up to five tons (where the chain fall would weigh about 100 lbs.) a small shackle (not shown) is mounted in the openings 50, 52 by means of a hook, which shackle lifts into position the hook of the larger chain fall which can then be placed in the apertures 46, 48, after which the smaller chain fall may be removed from the openings 50, 52. Thus the smaller apertures serve to aid the lifting of the heavy chain fall where the weight would be too great for one man to lift the same over his head. Under some conditions of use, such as when loading or repairing a ship, constant vibration may tend to loosen the wedge. Where such a possibility exists, the apertures 50, 52 are used to connect the clamping members to each other.

When it is desired to prevent any sliding movement along the beam, such as during a period of waiting for a new operation to begin, the load may be shifted so that the chain fall is supported through the apertures 50, 52. The application of the load at the sides of the clamping members by means of these apertures causes the clamping members to tend to rotate, thus further preventing slippage. This operation is effective when using only one chain fall, such as shown in Figure 1. The hook 62 may be connected to a chain or other supporting means which is threaded through the apertures 50, 52 so that the load is supported by these apertures in an offset manner causing rotation of the clamping members in a clockwise direction, as seen in Figure 6, thus more efficiently locking the wedge in position. The wedge member may be released by tapping it on its small end 80, seen in Figure 2, so that it will move in the opposite direction. It will be understood that various modifications may be utilized, and although the wedge shown is one form of a cam, other well known forms of cams may be used. Similarly, the load is supported through apertures in the clamping members, but any suitable means for supporting a load may be substituted for the apertures shown.

The above description and drawings disclose several embodiments of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

I claim:

1. A beam clamp comprising a pair of complementary separable clamping members, each clamping member having a spaced pair of hooked clamps and side plates adapted to face each other when said clamping members are in clamping position, said hooked clamps forming rigid integral parts of each clamping member, means on said side plates for releasably connecting said clamping members to each other in position on the upper sides of the flanges of a supporting member, and cam means adapted to engage the opposite lower sides of the said flanges and at least one of said clamping members between its pair of hooked clamps whereby to clampingly engage said clamping members to said supporting member and to prevent relative movement of said clamping members longitudinally of each other in a direction parallel to the flanges of said supporting member, and at least one of said supporting members having a load supporting means thereon.

2. The structure of claim 1 wherein said cam means comprises a wedge.

3. The structure of claim 2 wherein said wedge has an upper surface, said surface having cutting edges and a concave surface between said edges.

4. The structure of claim 3 wherein at least one of said clamping members is provided with an upper concave surface for the reception of said wedge, said cutting edges being adapted to engage the under surface of said supporting means when said beam clamp is attached thereto with said wedge in engagement with said upper concave surface.

5. The structure of claim 1 wherein at least one of said clamping members is provided with a concave upper surface, and said cam means comprises a wedge adapted to engage said concave upper surface.

6. The structure of claim 5 wherein said wedge is provided with cutting edge means.

7. The structure of claim 6 wherein at least one of said clamping members is provided with an upper concave surface for the reception of said wedge, said cutting edges being adapted to engage the under surface of said supporting member when said beam clamp is attached thereto with said wedge in engagement with said upper concave surface.

8. The structure of claim 1 wherein at least one of said clamping members is provided with a wedge seating surface located between the hook clamps of said clamping member.

9. The structure of claim 1 wherein said load supporting means comprises an aperture located between the pair of hook clamps on said member.

10. The structure of claim 1 wherein each clamping member is provided with side edges, said load supporting means being located between one of said hook clamps and a side edge of its clamping member.

11. The structure of claim 1 wherein said first named means comprises a stud member on one side face and a slot member on the other side face, each stud member of one side face being in juxtaposed position to a slot member of the other side face and in interlocking relationship therewith when said clamping members are attached to each other.

References Cited in the file of this patent

UNITED STATES PATENTS

| | | |
|---|---|---|
| 1,024,611 | Bates | Apr. 30, 1912 |
| 1,074,407 | Braden | Sept. 30, 1913 |
| 1,261,036 | Kerns | Apr. 2, 1918 |
| 1,302,544 | Hartburg | May 6, 1919 |
| 1,531,091 | Haasted | Mar. 24, 1925 |
| 1,561,515 | Geeson | Nov. 17, 1925 |
| 2,220,203 | Branin | Nov. 5, 1940 |

FOREIGN PATENTS

| | | |
|---|---|---|
| 15,974 | Great Britain | July 17, 1902 |
| 920,421 | Germany | Nov. 22, 1954 |